Dec. 30, 1941.     W. OGG     2,267,943
DEVICE FOR WORKING AND CULTIVATING TURF
Filed Jan. 19, 1940

Inventor:
William Ogg
By Owen W. Kennedy
Attorney

Patented Dec. 30, 1941

2,267,943

UNITED STATES PATENT OFFICE 2,267,943

DEVICE FOR WORKING AND CULTIVATING TURF

William Ogg, Worcester, Mass.

Application January 19, 1940, Serial No. 314,655

4 Claims. (Cl. 55—30)

The present invention relates to a device for working and cultivating turf, the device being particularly adapted for renovating the turf of golf greens and other areas used by players.

Whenever turf, such as is found on golf greens, bowling greens, or tennis courts, is subjected to heavy use by players, the turf compacts to such a degree that it is very difficult to work and properly cultivate the same. When turf has become so compacted, it is very difficult to properly fertilize the roots, and heavily played golf greens often become so firm that even water will not penetrate, with the result that the turf will dry out and be seriously damaged by further use. While various expedients have heretofore been employed for breaking up the turf, as by means of spiked rollers, difficulties arise when the turf tears out and lifts up with the spikes, thereby destroying the evenness of the turf's surface to such an extent as to require its renewal.

According to the present invention, there is provided an improved device for working and cultivating turf, characterized by its ability to cut cleanly through the turf to a predetermined depth, while at the same time firmly holding down the turf to prevent lifting thereof. After being operated upon by my improved device, a turf area can be readily treated with the desired fertilizers, with the assurance that fertilizer, as well as moisture, will penetrate to the roots. The above and other advantageous features of the invention will hereinafter more fully appear, from the following description considered in connection with the accompanying drawing, in which:

Figure 1:
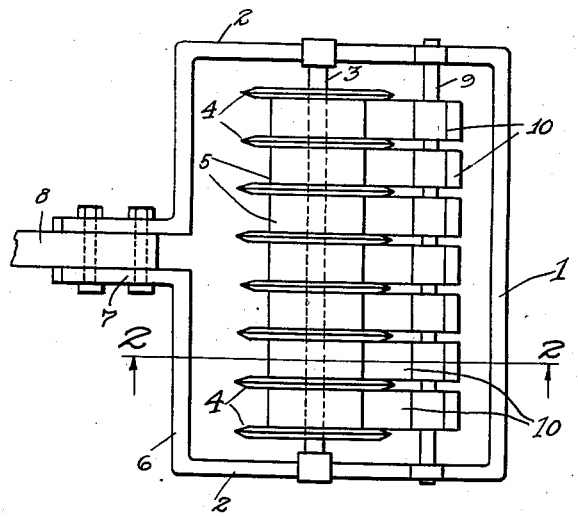
Fig. 1 is a plan view of a turf working and cultivating device embodying the invention.

Referring to the drawing, the device consists of a frame 1 providing side members 2 for rotatably supporting a shaft 3. The shaft 3 carries a number of sharp-edged knife disks 4, separated by spacing collars 5, with the knife disks 4 being of such diameter as to extend a considerable distance below the edge of the frame 1.

The front member 6 of the frame provides a connection 7 for a suitable tongue or draw bar 8, whereby the device may be drawn along the ground surface by any suitable means, such as a tractor. When the device is drawn over a thick bed of turf, such as is found on a golf green, the knife disks 4 cut into the turf to an extent determined by the difference in diameter between the disks 4 and the spacing collars 5, as clearly shown in Fig. 2. The extent to which the disks cut into the turf may vary anywhere from two to four inches, depending on the thickness of the turf and the nature of the ground on which the turf is laid, and obviously, the size of the disks 4 and collars 5 can be varied to suit conditions.

Figure 3:
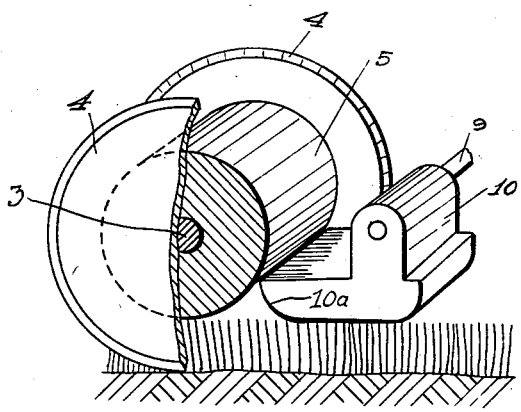
Fig. 3 is a fragmentary perspective view, on an enlarged scale, showing the mounting of a turf-holding shoe.

A second shaft 9 extends between the side members 2 parallel to the disk shaft 3, and a number of turf-holding shoes 10 are mounted on the shaft 9. As best shown in Fig. 3, each shoe 10 is flat on its under side, and is so mounted that its under side is disposed in a horizontal plane substantially tangent to the cylindrical surface of a spacing collar 5. The forward end of each shoe is beveled upwardly, as indicated at 10a, and projects into the space between adjacent knife disks 4, with its edge substantially in contact with the collar.

Figure 2:
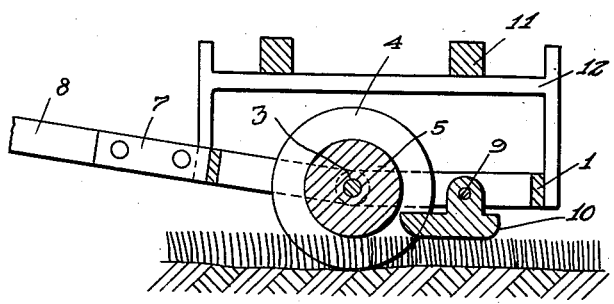
Fig. 2 is a vertical sectional view along the line 2—2 of Fig. 1.

When the device is drawn along the turf in the direction of the arrow in Fig. 2, it is evident that the knife disks 4 will cut into the turf, with the spacing collars 5 and shoes 10 riding on the surface thereof. As the disks 4 turn, any tendency of the turf to rise up between disk cuts will be counteracted by the shoes 10, which will hold down the turf uniformly, so that the surface of the turf is undisturbed by the passage of the device. On the other hand, the surface which has been passed over will be traversed by parallel cuts extending clear through to the ground on which the turf is laid, so that moisture, with or without fertilizer, will penetrate the turf easily and reach the roots.

In order to cause the knife disks to cut properly, the frame may be provided with weights 11, supported on cross members 12, not shown in Fig. 1, the number of weights 11 being varied to suit the desired depth of cut and the compactness of the turf being worked. It has also been found that when the frame is drawn across the turf of a golf green without any weights, the knife disks penetrate only far enough to serve as effective cutters of the cross grain of the turf, thereby greatly improving the playing surface of the green.

Figure 4:
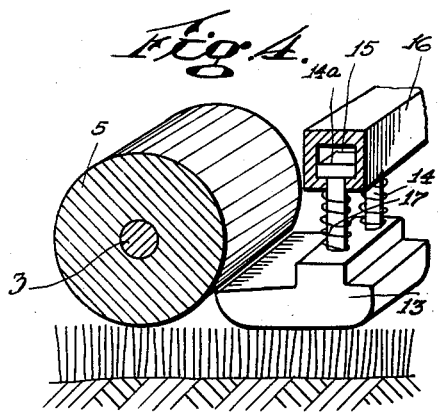
Fig. 4 is a fragmentary perspective view, illustrating a modified form of shoe mounting.

Referring now to Fig. 4, there is shown a modified arrangement for yieldingly mounting the turf-holding shoes, so that each shoe will be capable of a certain amount of individual adjustment to the surface of the turf. To this end, each shoe 13 is supported by a pair of studs 14 having their heads 14a loosely received in a guideway 15 provided in a bar 16 extending between the side members 2 of the frame. Springs 17 surrounding the studs 14 yieldably maintain the shoes 13 away from the bar 16, so that each shoe is independently movable with respect to the bar 16.

When turf having a rolling surface is encountered, as with many golf greens, the individually yieldable shoes 13 following behind the disks 4, are adapted to accommodate themselves to the surface of the turf, while at the same time firmly holding down the same. This self adjustment of the shoes effectively prevents them from digging into the turf when undulations in the surface of the turf raise one end of the cutter disk frame higher than the other.

From the foregoing, it is apparent that by the present invention there is provided an improved device for working and cultivating turf, characterized by the ability of its knife disks to cut cleanly through the turf to a depth sufficient to permit the penetration of moisture and fertilizer, while at the same time firmly holding down the turf between cuts, to prevent lifting thereof.

I claim:

1. A device for working turf comprising a frame carrying a shaft, a plurality of sharp-edged cutting elements mounted in spaced relation on said shaft, a supporting member extending parallel to the axis of said cutter shaft, and a plurality of shoes mounted in spaced relation on said supporting member and extending between said cutting elements for holding down turf between cuts made by said elements, said shoes being capable of individual movement relative to said frame.

2. A device for working turf comprising a frame carrying a shaft, a plurality of sharp-edged cutting elements mounted in spaced relation on said shaft, a supporting member extending parallel to the axis of said cutter shaft, a plurality of shoes carried by said supporting member, and individually yieldable with respect to said frame, for holding down the turf between cuts made by said elements.

3. A device for cutting turf comprising a frame, a shaft carried by said frame, a plurality of cutting disks mounted on said shaft, spacing collars disposed between said disks, a supporting member extending parallel to the axis of said cutter shaft, and shoes carried by said supporting member and cooperating with said spacing collars for holding down the turf between cuts made by said disks.

4. A device for cutting turf comprising a frame, a shaft carried by said frame, a plurality of cutting disks mounted on said shaft, spacing collars disposed between said disks of less diameter than said disks, to determine the depth of the cut made by the latter, and shoes carried by said frame extending into the spaces between said disks and cooperating with said collars to hold down the turf between the cuts made by said disks.

WILLIAM OGG.